United States Patent [19]
Brown et al.

[11] 3,942,381
[45] Mar. 9, 1976

[54] ULTRASONIC PRESSURE TEST METHOD AND APPARATUS

[76] Inventors: William G. Brown, 6379 Oakcreek Way, Citius Heights, Calif. 95610; Lee C. Paxton, 5050 North Ave., Carmichael, Calif. 95608

[22] Filed: Jan. 29, 1974

[21] Appl. No.: 437,644

[52] U.S. Cl. ............................ 73/398 R; 73/67.5 R
[51] Int. Cl.² .......................................... G01L 9/00
[58] Field of Search ........ 73/388, 398 R, 67.5, 67.6, 73/67.8 R, 290 V, 40.5 A, 24

[56] References Cited
UNITED STATES PATENTS

| | | | |
|---|---|---|---|
| 2,458,771 | 1/1949 | Firestone | 73/67.8 |
| 2,527,208 | 10/1950 | Berry et al. | 73/398 R |
| 2,978,899 | 4/1961 | Kritz | 73/24 |
| 3,093,998 | 6/1963 | Albertson et al. | 73/67.7 |
| 3,251,221 | 5/1966 | Vogel et al. | 73/67.7 |

*Primary Examiner*—Donald O. Woodiel
*Attorney, Agent, or Firm*—Blair & Brown

[57] ABSTRACT

An ultrasonic pressure test method and apparatus that utilizes a reflectoscope, and an oscilloscope and an ultrasonic crystal and wherein the length of time that it takes for an echo to be returned is measured to provide a method and means for measuring and using the ultrasonic readings to determine whether the contents or pressure of a bottle, container or other member is proper or of the desired or safe quantity.

2 Claims, 12 Drawing Figures

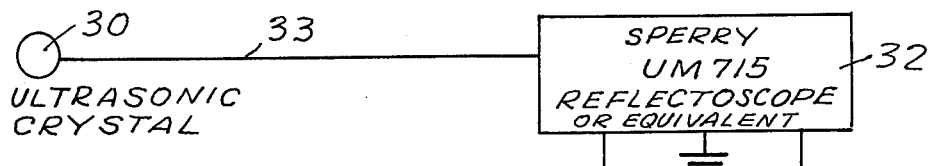
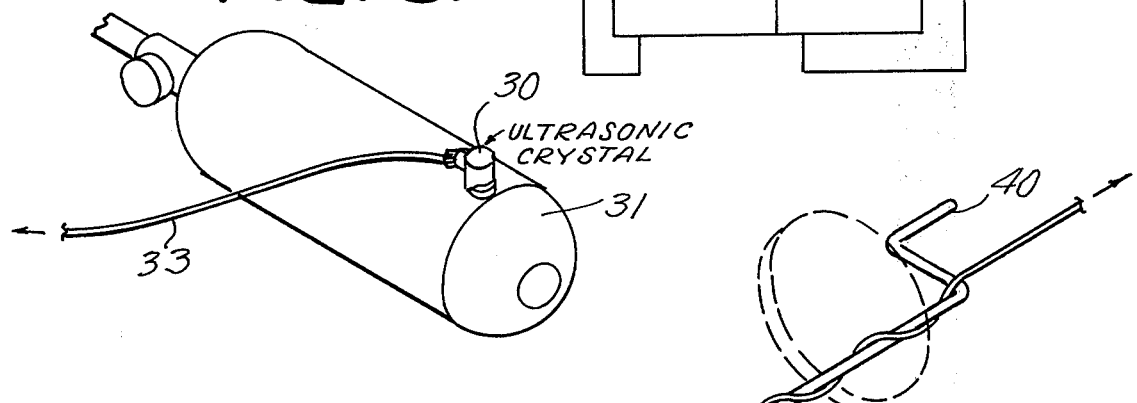
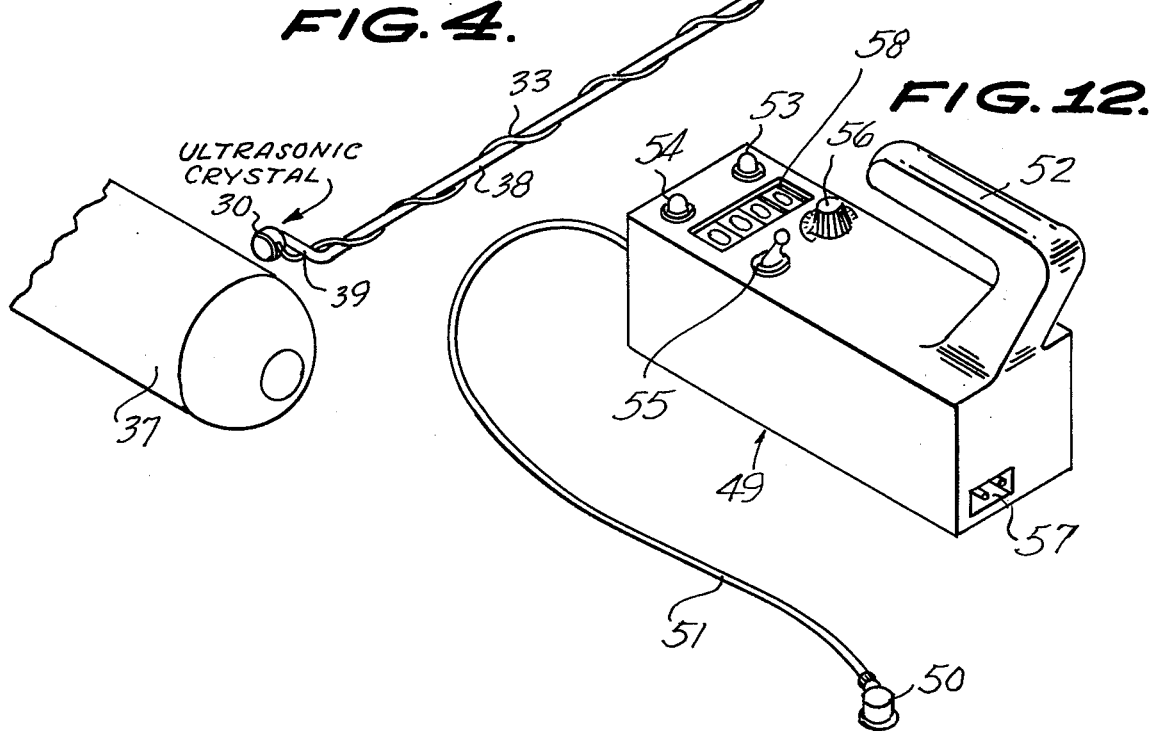

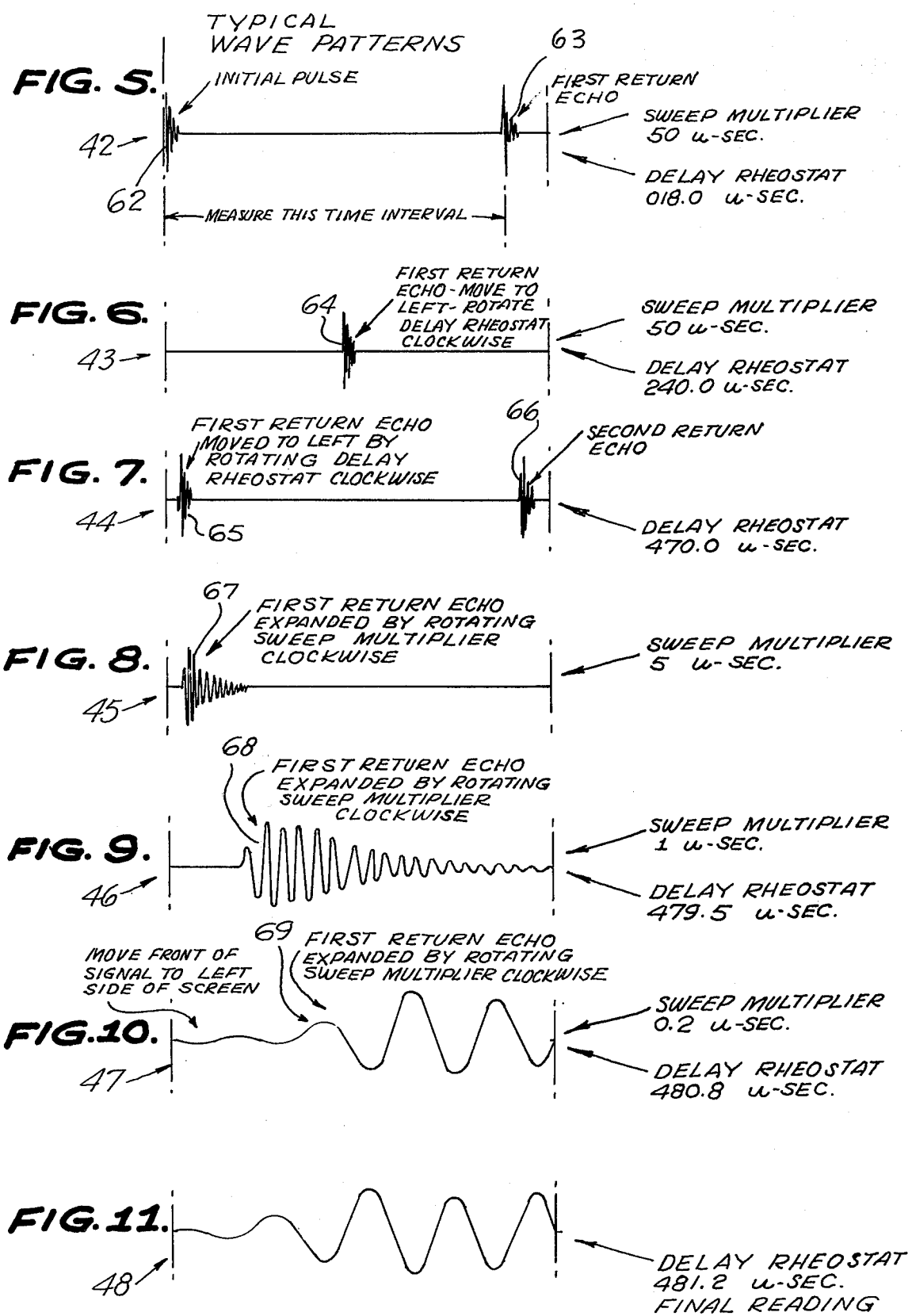

ULTRASONIC PRESSURE TEST METHOD AND APPARATUS

BACKGROUND OF THE INVENTION

Field of the Invention

The present invention relates to ultrasonic pressure testing devices and a method of utilizing the same.

SUMMARY OF THE INVENTION

A method and means for using ultrasonic energy to test gas pressure in modules, bottles, pressure tanks, air conditioning systems, or any other suitable members is provided. With the present invention, a reflectoscope and an oscilloscope are electrically connected to an ultrasonic crystal, and wherein the crystal is arranged in engagement with the pressure bottle or other member being tested so that the user can measure the time utilized in passing sound thru a member in order to determine the condition of the member or unit being tested.

The primary object of the present invention is to provide a method and means for testing using ultrasonic energy wherein signals are passed thru a member or unit being tested and returned so that the lapsed time is measured and determined in order to provide an exact and useful reading for determining the contents or condition of the unit or member being tested.

Still another object of the present invention is to provide an ultrasonic pressure test method and apparatus that is relatively simple and inexpensive to utilize or carry out and which is generally easy to operate.

Other objects and advantages will become apparent in the following specification when considered in the light of the attached drawings.

BRIEF DESCRIPTION OF THE DRAWINGS

FIG. 2 is a schematic view illustrating the present invention;

FIG. 3 is a perspective view showing a bottle or container being tested and illustrating the ultrasonic crystal connected thereon;

FIG. 4 is a fragmentary perspective view illustrating a remote location being tested by using an elongated member;

FIGS. 5 through 11 are schematic views illustrating typical wave patterns; and

FIG. 12 is a perspective view illustrating a modified form of the present invention wherein there is provided a portable ultrasonic pressure test device.

DESCRIPTION OF THE PREFERRED EMBODIMENT

Figure 1:
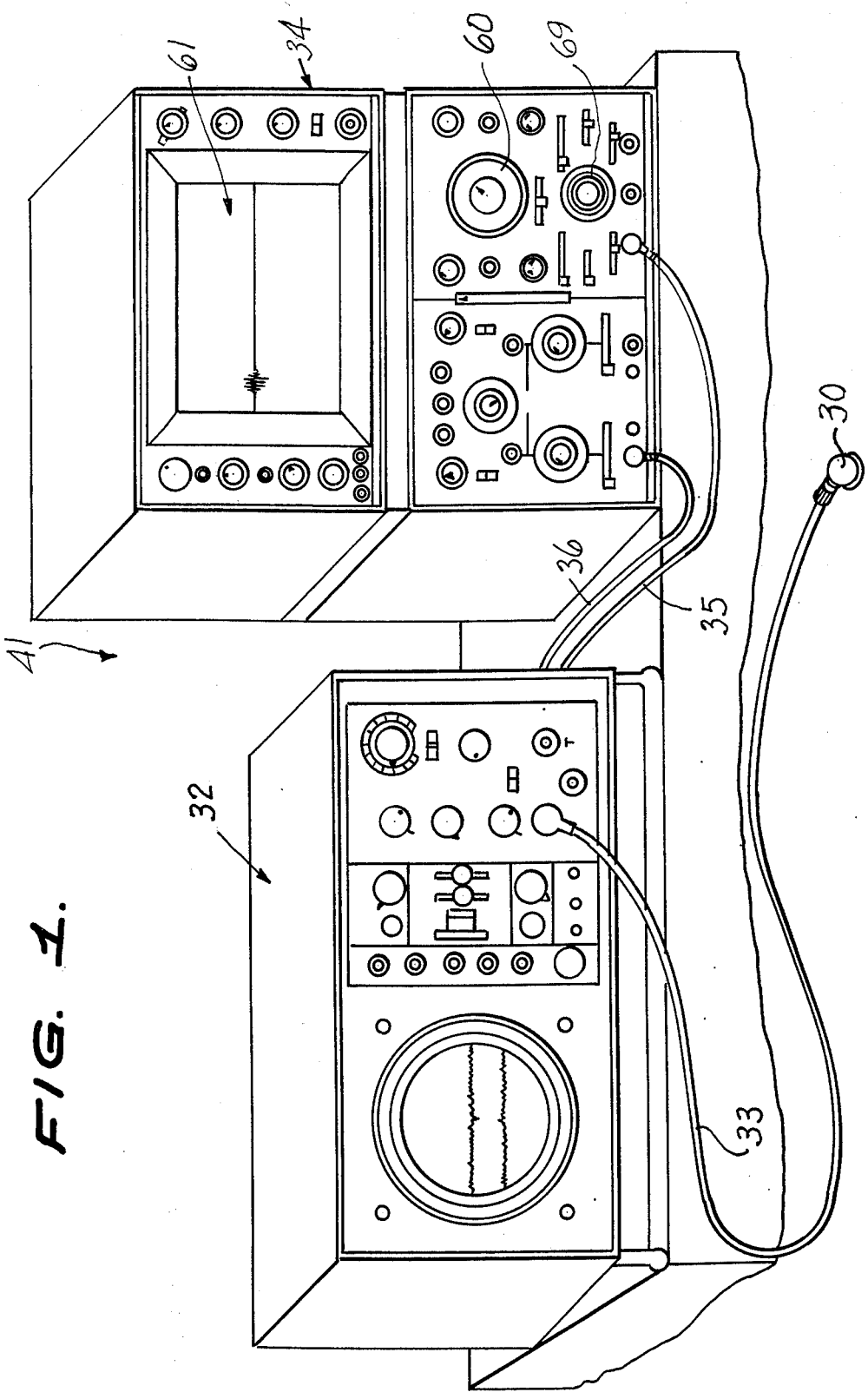
FIG. 1 is a front perspective view illustrating the test apparatus of the present invention.

Referring now to the drawings in detail, the numeral 30 indicates an ultrasonic crystal which is adapted to be used for or in conjunction with other elements for measuring or testing pressure in a bottle, or the like as indicated by the numeral 31 in FIG. 3. The test apparatus is indicated generally by the numeral 41 in FIGS. 1 and 2.

As shown in the drawings, the test apparatus 41 consists of a reflectoscope 32 and oscilloscope 34. The reflectoscope 32 has the ultrasonic crystal 30 connected thereto as by means of a cable 33. The oscilloscope 34 and reflectoscope 32 are electrically connected together by means of cables or lines 35 and 36.

Referring now to FIG. 4 of the drawings, the numeral 38 illustrates a means whereby members such as the bottle 37 can be tested at a remote location and for this purpose, an elongated rod 38 is provided that is adapted to have the cable 33 wrapped therearound, and the rod 38 has an angularly arranged end portion 39 so that the ultrasonic crystal 30 can be positioned in the desired location relative to the member 37 being tested. The rod 38 may have a hand gripping portion 40 for facilitating the manual manipulation thereof.

Referring now to FIGS. 5 through 11 of the drawings, there is illustrated typical wave patterns and the numerals 42, 43, 44, 45, 46, 47 and 48 generally indicate these particular figures.

Attention is now directed to FIG. 12 of the drawings, wherein the numeral 49 indicates a modified or alternative form of the present invention that is in the form of a portable device that has the ultrasonic crystal 50 connected thereto by means of a cable 51, and the device 49 may have a handle 52 thereon for facilitating the carrying of the device.

From the foregoing, it will be seen that there has been provided an ultrasonic pressure test device and method for use with the parts arranged as shown in the drawings; when the pressure on a member such as the bottle 31 of FIG. 3 is to be tested, the ultrasonic crystal 30 is arranged as shown and the apparatus will give a reading on the instruments as to the lapsed time for the echo to bounce off of the member or substance being tested whereby the user can determine the pressure or contents in the member such as the bottle 31.

The parts can be made of any suitable material and in different shapes or sizes as desired or required.

FIG. 12 illustrates a variation or modification which is in the form of a hand held portable ultrasonic tester that is indicated by the numeral 49. The device of the present invention can be used for determining the Freon pressure in a closed air conditioning system wherein the device will save refrigeration repairmen considerable time. As an example, a service man testing air conditioners may have a tester together with a booklet having the various model numbers and/or sizes printed therein and opposite the same will be the Freon pressure which the unit contained when delivered from the manufacturer. The service man would merely place the crystal on the line and by the reading registered on the tester, would quickly ascertain by checking the book whether or not additional Freon was needed.

With further reference to the hand held portable ultrasonic tester 49, this device may have self-contained batteries for power or may be plugged into a standard outlet. It incorporates integrated circuitry, and measures the time interval between an initial "output" pulse and the return echo. Peak return may be shown on a digital readout display in microseconds or any time indicating readout. Separate transmit and receive crystals can also be utilized.

Some of the uses of the present invention may be as follows: It has the capability to check pressures in pressure bottles such as bottles used to inflate automobile crash bags. It could also be used for determining liquid levels in tanks or bottles with or without content under pressure such as $CO_2$ fire extinguishers (used from the bottom to the top of the liquid level) or as depth meters. The device can also be used to determine the Freon pressure in a closed air conditioning system without breaking open the system.

With further reference to the device 49 shown in FIG. 12, the number 53 can indicate a green "OK" light, and the numeral 54 may be a red "NO-GO" light. The numeral 55 indicates an "ON-OFF" switch and the numeral 56 indicates a peaking adjustement knob. The numberal 57 indicates a cord outlet, or the device may be of the self-contained battery powered type. The numeral 58 indicates a digital readout unit that indicates in microseconds the desired information. The cable 51 may have a suitable length such as three feet long, and may be in the form of a coaxial cable with the ultrasonic crystal 50 thereon as shown in the drawings.

It will be noted that much of the equipment involved or used is conventional, such as the reflectoscope and oscilloscope. In addition to the previously described purposes of the present invention, the device can be used for checking out air conditioning by a service man whether in the home or large commercial installations.

FIG. 3 illustrates how the ultrasonic crystal 30 is placed on a convenient location on the cylinder portion of a pressure source bottle 31. This operation can be accomplished in an aircraft, for example, as well as on the bench with identical results. A small amount of petroleum jelly placed between the crystal 30 and the bottle 31, or between the crystal 30 of FIG. 4 and the bottle 37, is used to transmit the sound wave into the bottle. A light pressure is required to maintain the crystal in position. Rocking the crystal back and forth will not affect the accuracy of the reading appreciably, but it will affect the amplitude of the signal. In order to get a good strong signal, it may be necessary to try several spots on the bottle until one spot is found which will give satisfactory results. If a pressure source bottle has no pressure in it at all, no reading will be obtained, because it takes too long for the echo to return to be measured. This provides a failsafe device for preventing erroneous readings from being obtained.

As shown in the drawings, the equipment required to perform the ultrasonic testing may consist of a reflectoscope 32 that is of the type that is readily available wherever ultrasonic testing is being accomplished. The crystal is connected to the receiving section of the reflectoscope at a frequency such as a frequency of 2.25 megacycles, and is employed to perform the test.

In actusl use, the leads may be tapped off the back side of the reflectoscope 32 and introduced into an oscilloscope such as the oscilloscope 34, and any standard delay function oscilloscope can be used for this job. For example, a Hewlett Packard oscilloscope can be used, but it is to be understood that the present invention is not limited to any specific type of such equipment. The 2.25 megacycle ultrasonic crystal, such as the crystal 30, and appropriate hookup cables are also used with this equipment. The output signals from the reflectoscope 32 are tapped off the back at the plug provided thereon and a suitable ground connection or the like may be provided. The parts can be arranged to trigger the sweep on the screen and the output from the reflectoscope may be routed by means of a cable to the vertical amplifier section of the oscilloscope 34. The purpose in utilizing the two pieces of equipment is for the reflectoscope 32 to produce the basic sonic pulse sent through the bottle such as the bottle 31, and the oscilloscope is used to conveniently and accurately measure the return echo. By utilizing a delay digital rheostat on the oscilloscope, a very accurate determination of the actual time required from the initial pulse to the return echo can be determined, and will be shown displayed on the oscilloscope. By measuring the amount of time required from the initial impulse echo and comparing this time quantity to that of the table of allowable limits for a similar average bottle, will give a very good indication of the amount of pressure in that bottle and can be as accurate as plus or minus 20 PSI in 4000 PSI (one-half of 1 percent).

The actual microsecond time measurement is read from the "delay rheostat" knob 59 at the lower right hand side of the oscilloscope 34, after the "first return echo" has been properly positioned and expanded at the left side of the display screen. This is accomplished by rotating the "delay rheostat" 59 and "sweep multiplier" 60, FIG. 1. To obtain the signal with the impulse displayed as in FIG. 5 the delay rheostat 59 must be as close to "000.0" microseconds as possible. The signal will drop out (no trace at all) as "000.0" microsecond position is approached, and thus the delay rheostat knob 59 must be rotated clockwise until the trace reappears. The sweep multiplier 60 can be set at a proper setting such as 50 microseconds position. The final ultrasonic reading is taken by reading the delay rheostat knob 59 after having moved the first curve of the first return echo to the left side of the oscilloscope screen 61 as demonstrated in FIGS. 5 through 11.

The values indicated herein are approximate ultrasonic values to expect at a temperature such as 70° Fahrenheit. The exact ultrasonic limits to be expected can be taken from suitable tables which may give the upper and lower acceptable limits for each type of bottle. The tables and accessories may be calibrated to compensate for readings at temperature variations and the like. However, in actual practice it is important that the inside of the bottles approach the proper temperature as close as possible so that when equipment is being tested, preferably the test temperature is achieved by permitting the parts to assume the proper test temperature for at least a couple of hours prior to conducting the test. The outside shell of a bottle such as the bottle 31 or 37 may be an excellent insulator and resist rapid temperature changes.

It will be noted that if the readings obtained from the bottles fall within the limits established on the table for that bottle, at the temperature the readings were taken, then the bottle passes the ultrasonic pressure test and its use may be continued. However, if the ultrasonic readings fall outside the allowable limits, the bottle must be pulled and the weight checked.

Thus, in conclusion, some of the problems that may be encountered are as follows: temperature may have an effect on the readings so that it is important to carefully monitor the temperature during the test and compare the test results with the ultrasonic readings to be expected at the temperature.

Also, machine warm-up is very important, since machine warm-up can affect as much as three microseconds difference in the ultrasonic readings and can best be accounted for by allowing the machine to warm up for one hour prior to conducting the test without unplugging the unit at any time during this period until readings have been taken.

Furthermore, occasionally, a bottle may fail to pass the ultrasonic test, but will pass the weight check. In this case, a bottle may be continued to be used in service and a careful notation of the ultrasonic reading should be made in the records. This reading can be compared with later readings and the bottle may not have to be unnecessarily removed a second time. The later consecutive readings should be within five microseconds of the initial reading, or the bottle is again to be pulled for a weight check.

FIG. 3 illustrates the ultrasonic crystal 30 placed on the cylinder portion of the bottle 31 and petroleum jelly may be used to transmit sound waves into the bottle.

When testing hard to reach equipment, an ultrasonic probe pole assembly and an ultrasonic test coaxial cable assembly may be used for ultrasonic pressure test procedures. The pole assembly including the member 38 shown in FIG. 4 can be used for performing ultrasonic tests of parts in remote, difficult to reach locations.

When testing fiberglas pressure sources, the present invention can be used to verify that fiberglas pressure sources are adequately charged. As previously noted the pressure sources should have been at tested temperatures within 3°F for at least two hours prior to the test. Test preparation consists of gaining access to pressure sources and preparing test equipment for ultrasonic readings. Various parts can be moved in order to permit access to be gained thereto. Also, suitable procedures can be initially followed for setting up the test equipment, such as calibrating the test equipment. The reflectoscope 32 can be adjusted to obtain a response on the cathode ray tube screen using certain necessary initial control settings. The instruments are adapted to be synchronized when being used. The crystal such as the crystal 30 or the crystal 50 function as ultrasonic transducers. Petroleum jelly or the like is used to assure that there is an adequate couplant between the transducer and the pressure source.

Attention is further directed to the typical wave patterns shown in FIGS. 5 - 11. In FIG. 5, the numeral 62 indicates the initial pulse, while the numeral 63 indicates the first return echo, and there is shown in FIG. 5 the time interval that is measured. With further reference to FIG. 5, the main sweep multiplier, delay time multiplier, and sensitivity are adjusted to locate the initial pulse and first echo. Horizontal position is adjusted to align the initial pulse with the first scale mark on the left of the screen.

In FIG. 6, the numeral 64 indicates the first return echo, and the delay time multiplier may be rotated counterclockwise to move the first echo to the left of the screen. In FIG. 7 the numeral 65 indicates the first return echo that can be moved to the left by rotating the delay rheostate clockwise, and in FIG. 7 the numeral 66 indicates the second return echo. In FIG. 8, the numeral 67 indicates the first return echo expanded by rotating the sweep multiplier clockwise. In FIG. 9, the numeral 68 shows the first return echo expanded by rotating the sweep multiplier in a suitable direction such as in a clockwise direction. In FIG. 10, the numeral 69 shows the first return echo expanded by rotating the sweep multiplier in a suitable direction such as a clockwise direction. FIG. 11 illustrates the leading edge of signal aligned with the first scale mark, and the delay time multiplier may be rotated to align the leading edge of the signal to the left of the screen.

Also, suitable evaluation procedures are adapted to be carried out for each pressure source being tested.

It will be noted that any suitable equipment can be used with the present invention. For example, while a Hewlett Packard oscilloscope has been illustrated or described, it is to be understood that any equivalent equipment such as a suitable delayed type of oscilloscope can be utilized. Furthermore, while a Sperry type of reflectoscope has been illustrated, it is to be understood that any similar equivalent equipment can also be used in place of the Sperry reflectoscope.

As previously noted, the wave patterns of FIGS. 5 through 11 are merely illustrative of typical wave patterns, and the various readings would, of course, change with each type of pressure source as well as the pressure and temperature in the particular bottle.

The test equipment of the present invention can be used for testing equipment on aircraft. However, it is to be understood that the present invention is not limited to such use since it has various other applications. By using the present invention, there will be an important cost savings in performing such tests by using the herein described ultrasonic technique as for example, instead of using conventional weighing procedures in connection with glass bottle pressure sources. These savings occur mainly in eliminating the maintenance man hours for equipment removal to gain access to the bottles for weighing and the material cost for replacement of bottles, weighing and reinstallation. Thus, when used for testing airplane apparatus, there will be additional savings from the advantage of extending the bottle service life to the life cycle of the airplanes.

It will therefore be seen that in accordance with the present invention, there is provided a process and apparatus that employs ultrasonic sound to measure the pressure of gas in bottles or other containers. A measurement is taken of the time required for an impulse of a high frequency sound wave to travel through the gas, echo off the other side of the container wall, and return to the receiver transmitter crystal. The principle behind this technique is that the velocity of a sound wave varies inversely with the pressure of the medium through which it is passing. In other words, for geometrically identical bottles, it will take longer for an impulse to travel through the one at a lower pressure.

The present invention thus uses sound to determine pressure, and uses sound waves to measure pressure or contents in containers. The invention uses sound waves to measure gas pressure in containers, and utilizers ultrasonic reflection to determine gas pressure in pressure containers such as metal cylinders, fiberglas cylinders and the like, without breaking the seal on the container. There is provided a more precise method by using an oscilloscope to extend the range and effectiveness of a reflectoscope. The present invention allows the pressure of a gas to be measured accurately without tapping into the container, disturbing the seal, or in any way affixing an external gauge.

The present invention is especially suitable for testing installed pressure sources in aircraft. Thus, the present invention can be used for measuring the pressure in aircraft pressure source bottles wherein such bottles may be of the type that are used to inflate the impact attenuation, flotation and self-righting bags during emergency egress of the crew. Previously, the bottles had to be removed and weighed to determine pressure. The ultrasonic pressure test technique allows the pressure to be measured without removing the bottles from the aircraft nor disturbing the sealed contents.

With further reference to testing of aircraft equipment, as is known, pressure source bottles for various bags associated with aircrafts need to be checked periodically for leakage. The procedure for accomplishing this check presently requires removing the bottles from the aircraft and weighing them. It involves taking off the windshields, removing the recovery parachute and disconnecting several pyrotechnic lines, among other operations. All of this handling exposes these items to damage and adds up to many man hours of labor simply to check the pressure of the various bottles in one aircraft.

The present invention provides a faster, safer and more accurate method for completing this task, wherein ultrasonic sound is used to directly measure the pressure of the nitrogen gas or other gas in the bottles. A measurement is taken of the time required for an impulse of a high frequency sound wave to travel through the gas, echo off the other side of the cylinder wall, and return to the receiver transmitter crystal. The principle behind the techique is that the velocity of a sound wave varies inversely with the pressure of the medium through which it is passing. In other words, for geometrically identical bottles, it will take longer for an impuse to travel through the one with the lower pressure.

In actual use, a crystal need only be placed against a given bottle while it is still in the aircraft, and the resulting reading examined to determined if it falls within certain limits. If not, it should then be pulled and weighed, probably to be replaced. The advantage of this technique is in its simplicity. After an initial approximate half hour of equipment warm-up time, it would take a team of two men about fifteen minutes to check approximately five bottles on one airplane. The equipment required is easily operated and is usually available where such aircrafts are to be serviced.

Furthermore, another important consideration is that the bottles remain in place at all times. Not only will this eliminate leakage caused by removing and installing them, but it will reduce the chances of damage due to careless handling of other equipment.

Suitable tables, charts and the like are adapted to be used or provided with the equipment to give the acceptable high and low ultrasonic limits to be expected from that particular type of bottle or equipment at any test temperature such as from 16° Fahrenheit to 120° Fahrenheit.

Having thus described the preferred embodiment of the invention, it should be understood that numerous structural modifications and adaptations may be resorted to without departing from the spirit of the invention.

What is claimed is:

1. In an ultrasonic pressure testing apparatus, a reflectoscope, an oscilloscope, electrical circuit means electrically connecting said reflectoscope to said oscilloscope, an ultrasonic crystal providing a transducer, and electrical cable means connecting said transducer to said reflectoscope, said apparatus using ultrasonic sound to measure the pressure of gas in containers, and wherein when the transducer is placed against one side of a container a measurement is taken of the time required for an impulse of a high frequency sound wave to travel through the contents of the container, echo off the far side of the container, and return to the receiver transmitter crystal.

2. A method of using ultrasonic sound to measure directly the pressure of gas in bottles or other containers or systems comprising placing an ultrasonic crystal transducer against the side of the container, connecting a reflectoscope to the crystal, connecting an oscilloscope to the reflectoscope, driving the crystal at an ultrasonic frequency to send a high frequency impulse through the container to its far side, receiving an echo impulse from the far side of the container in response to the driven impulse, and measuring the time lapse between the driven impulse and receipt of the echo, the lapsed time being indicative of the pressure of gas within the container.

* * * * *